(12) United States Patent
Mears et al.

(10) Patent No.: US 8,356,330 B2
(45) Date of Patent: Jan. 15, 2013

(54) CHANNEL ENTRY SYSTEM AND METHOD

(75) Inventors: Mark G. Mears, Zionsville, IN (US); Minging (Mike) Xing, Fishers, IN (US)

(73) Assignee: Shenzhen TCL New Technology Ltd, Shekou, Shenzhen, Guangdong (CN)

( * ) Notice: Subject to any disclaimer, the term of this patent is extended or adjusted under 35 U.S.C. 154(b) by 928 days.

(21) Appl. No.: 11/809,600

(22) Filed: Jun. 1, 2007

(65) Prior Publication Data

US 2008/0022346 A1   Jan. 24, 2008

Related U.S. Application Data

(60) Provisional application No. 60/811,070, filed on Jun. 5, 2006.

(51) Int. Cl.
  *H04N 7/173* (2011.01)
  *H04N 7/18* (2006.01)
  *H04N 7/16* (2011.01)
  *H04N 5/44* (2011.01)
  *H04N 5/50* (2006.01)
  *H04N 5/445* (2011.01)

(52) U.S. Cl. ........ 725/131; 348/734; 348/569; 348/570; 348/563; 725/85; 725/100; 725/151

(58) Field of Classification Search .............. 348/563, 348/569, 570, 734
See application file for complete search history.

(56) References Cited

U.S. PATENT DOCUMENTS

| | | | |
|---|---|---|---|
| 6,661,472 B2 * | 12/2003 | Shintani et al. | ............ 348/732 |
| 6,707,508 B1 * | 3/2004 | Mears et al. | ............ 348/731 |
| 7,030,933 B2 | 4/2006 | Takagi et al. | |
| 7,050,117 B2 | 5/2006 | Takagi et al. | |
| 7,412,715 B2 | 8/2008 | Kim et al. | |
| 2002/0104102 A1 | 8/2002 | Takagi et al. | |
| 2002/0104103 A1 | 8/2002 | Takagi et al. | |
| 2003/0093813 A1 | 5/2003 | Shintani et al. | |
| 2003/0133050 A1 | 7/2003 | Shintani et al. | |

* cited by examiner

*Primary Examiner* — Kristine Kincaid
*Assistant Examiner* — Omar S Parra
(74) *Attorney, Agent, or Firm* — Fletcher Yoder P.C.

(57) ABSTRACT

An exemplary channel entry device comprises a SUBCHANNEL button. The exemplary channel entry device further comprises an OK button, and wherein the channel entry device is adapted to receive a subchannel selection after the SUBCHANNEL button is pressed and to thereafter transmit the subchannel selection to an associated electronic device when either the OK button or the SUBCHANNEL button is pressed.

19 Claims, 5 Drawing Sheets

400

CHANNEL ENTRY SYSTEM AND METHOD

CROSS REFERENCE TO RELATED APPLICATION

This application claims priority based on U.S. Provisional Application Ser. No. 60/811,070 filed on Jun. 5, 2006, which is incorporated by reference as though completely set forth herein.

BACKGROUND

This section is intended to introduce the reader to various aspects of art which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Channels on ATSC digital television (sometimes referred to as "HDTV") and satellite television can have two parts: a major channel number and a minor channel number (sometimes called a subchannel). For example, 8-2 (sometimes displayed as 8.2) is major channel 8 and minor channel 2. To directly enter a specific two-part channel number, a user would first use the number keys on the remote control to enter a major channel number. Next, the user would need to enter the minor channel number. Before the user enters the minor channel number, another key (for example, a "dash" (-) key or a "dot" (.) key) must be pressed to indicate that the following number is a subchannel. The dot or dash is sometimes referred to as a delimiter, which is typically labeled SUB CH or SUBCHANNEL on a remote control. The delimiter is similar in function to a decimal point key on a calculator. Instead of (or in addition to) a dash or dot key, other televisions allow pressing the RIGHT ARROW key to move the highlight of an onscreen display from the major channel field to the minor channel field in order to signal to the television that minor channel entry will now begin. Finally, to tune the television, the user would press an entry termination button (such as an OK button or an ENTER button) or wait a predetermined time (such as a few seconds) for the desired major-minor channel combination to be tuned. An improved system and method for entry of major-minor channel information is desirable.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
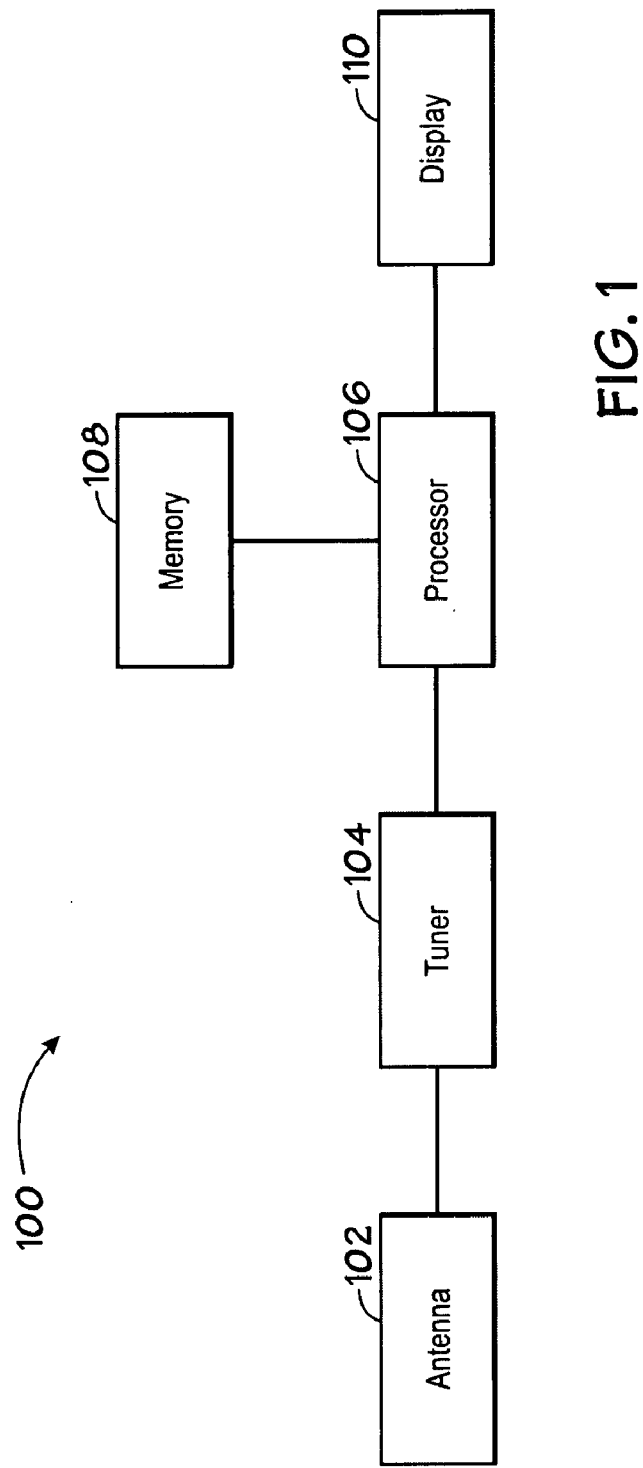
FIG. 1 is a block diagram of an electronic device that may employ an embodiment of the present invention.

FIG. 1 is a block diagram of an electronic device in accordance with an exemplary embodiment of the present invention. The electronic device (for example, a television, a digital video recorder, a cable television set top box, a satellite television set top box, a high definition radio receiver or the like) is generally referred to by the reference number 100. The electronic device 100 comprises an antenna 102, a tuner 104, a processor 106, a memory 108 and a display 110. The memory 108 may be adapted to hold machine-readable computer code that causes the processor 106 to perform an exemplary method in accordance with the present invention. The electronic device 100 may be adapted to receive commands from a remote control device.

An exemplary embodiment of the present invention makes entering and going to subchannels (minor channels) easier and faster. In one exemplary embodiment, a remote control device includes a SUBCHANNEL button to improve subchannel navigation.

In an exemplary embodiment of the present invention, the SUBCHANNEL button may be used (instead of an OK key or SELECT key, for example) to accept a channel entered. If the highlight is already on the subchannel entry field in the banner, then pressing the SUBCHANNEL button will act as an OK key and issue a subchannel command to tune to the channel entered in the major channel and subchannel fields. This saves the user from having to locate the OK (ENTER) key on the remote and move his thumb to that button (which may be far from the number keypad on the remote). In an exemplary embodiment of the present invention, the OK or SELECT key may still work to accept the channel entered, but it may not be as conveniently located.

In an exemplary embodiment of the present invention, the SUBCHANNEL button may be used to speed up intra-major-channel direct channel-entry. For example, while watching a digital TV channel (which has a two-part channel number, e.g., 8-1), pressing the SUBCHANNEL key may bring up the channel information banner, put the current major channel number into the major channel entry field, and put the highlight into the subchannel field of banner which is empty (e.g., "8._" where "_" is the location of the highlight waiting for the user to enter a subchannel number). If the user knows he wants to go to a particular subchannel of the current major channel, then this aspect would speed up his direct entry of that subchannel and his ability to get there faster since he would not have to press as many keys, especially if the major channel number is more than one digit (for example, in a digital cable system, a major channel might be as many as three digits long). This may be useful when there are many (e.g., >6) subchannels on a particular major channel since it would be faster to use this aspect of the invention than to press CHANNEL UP or CHANNEL DOWN.

In an exemplary embodiment of the present invention, when the SUBCHANNEL key is pressed, the channel information for the currently tuned channel is extracted from the TV's (or "system's") channel database. If it has a two-part channel number, the channel information "banner" (display) is displayed and the major channel entry field will then be populated with the major channel number extracted from the channel database; the focus ("highlight") is then moved to the subchannel field waiting for the user's input.

In an exemplary embodiment of the present invention, the SUBCHANNEL button may be used to go from analog TV channel to associated digital TV channel. While watching an analog TV channel, pressing the SUBCHANNEL key goes to the associated digital TV channel (e.g., the first digital subchannel), if available and shows the banner (if an associated digital subchannel is not available, does nothing). If the user is watching the analog channel, pressing SUBCHANNEL will change the channel to the digital equivalent of that channel quickly, without a lot of thought on the part of the user. In many circumstances, the digital equivalent of that channel would probably be higher in resolution (crisper, cleaner picture), widescreen, and in Dolby Digital sound.

In an exemplary embodiment of the present invention, when the SUBCHANNEL key is pressed, the television (also referred to as "TV" or "system" herein) obtains the channel information for the currently tuned channel from the channel database and, if the current channel is analog, the TV queries the channel database for the availability of the associated digital channel (combine the current channel number with a subchannel of "1"). The television is then tuned to the combined digital channel if it exists in the channel database and the channel information "banner" (display) is shown.

In an exemplary embodiment of the present invention, the SUBCH key may be used in menus to navigate to subchannel entry fields. For example, if a screen which uses the subchannel entry field is onscreen (e.g., Wake-Up Timer, Startup Channel, etc.) and the highlight is on the major channel digit-entry field, then pressing the SUBCHANNEL key will move the highlight to the subchannel digit-entry field. This is advantageous because, as long as the user is entering digits, it saves time to just press SUBCHANNEL to move the highlight onscreen rather than having to move a thumb on the remote from the digit keys to the arrow key and then back to the digit keys. In an exemplary embodiment of the present invention, pressing the SUBCHANNEL key does nothing if the television is tuned to a digital TV channel having a one-part channel number (e.g., DCR channel).

Figure 2:
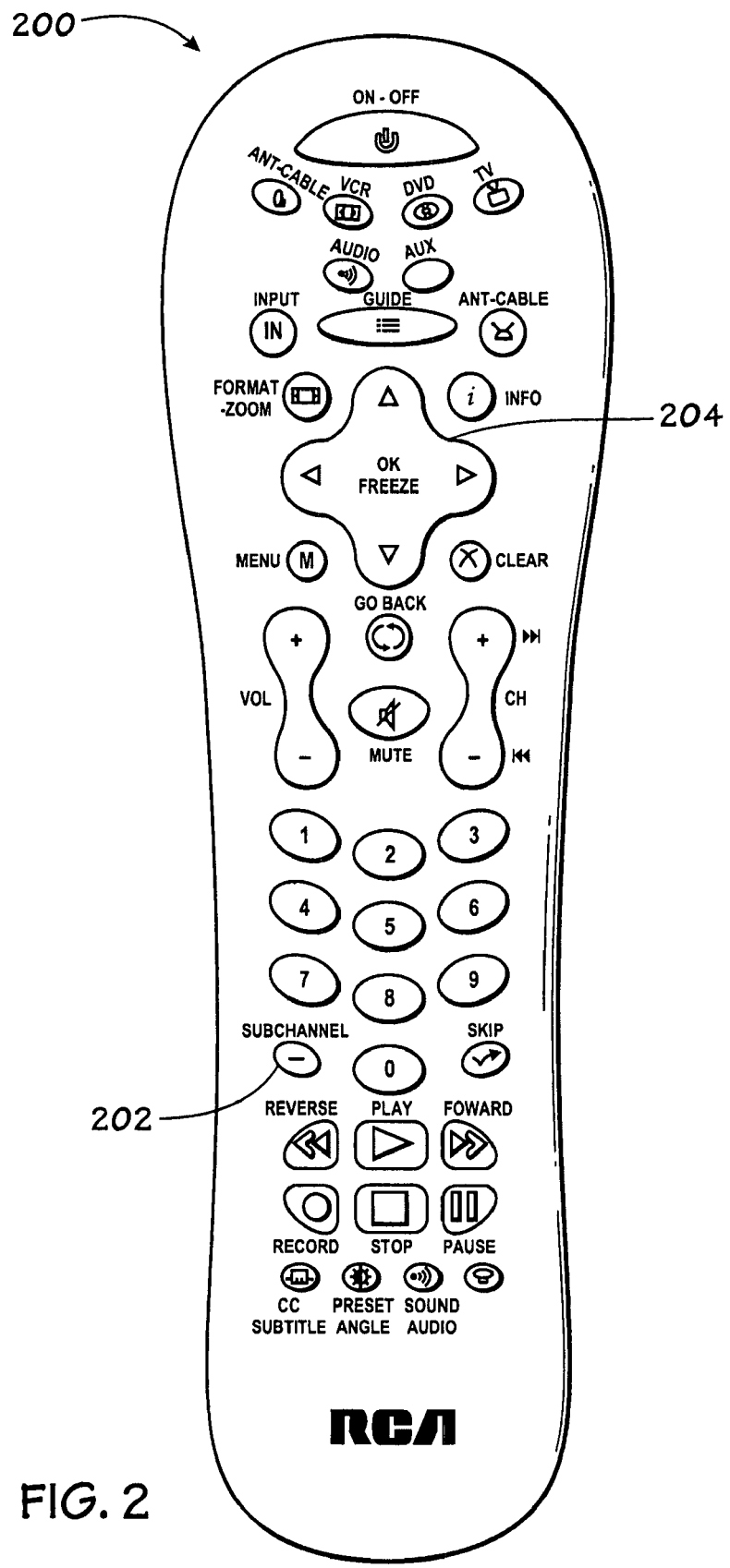
FIG. 2 is a top view of a remote control device in accordance with an exemplary embodiment of the present invention.

FIG. 2 is a top view of a remote control device in accordance with an exemplary embodiment of the present invention. The exemplary remote control shown in FIG. 2 is generally referred to by the reference number 200. The remote control 200 comprises a SUBCHANNEL button 202 and an OK button 204. Those of ordinary skill in the art will recognize that the OK button 204 is a general data submission button whose purpose is to signify to an associated electronic device that a user is ready to transmit input for action by the associated electronic device. Moreover, the OK button is not necessarily labeled "OK" but may be labeled "ENTER," "SEND," "SELECT" or the like.

Figure 3:
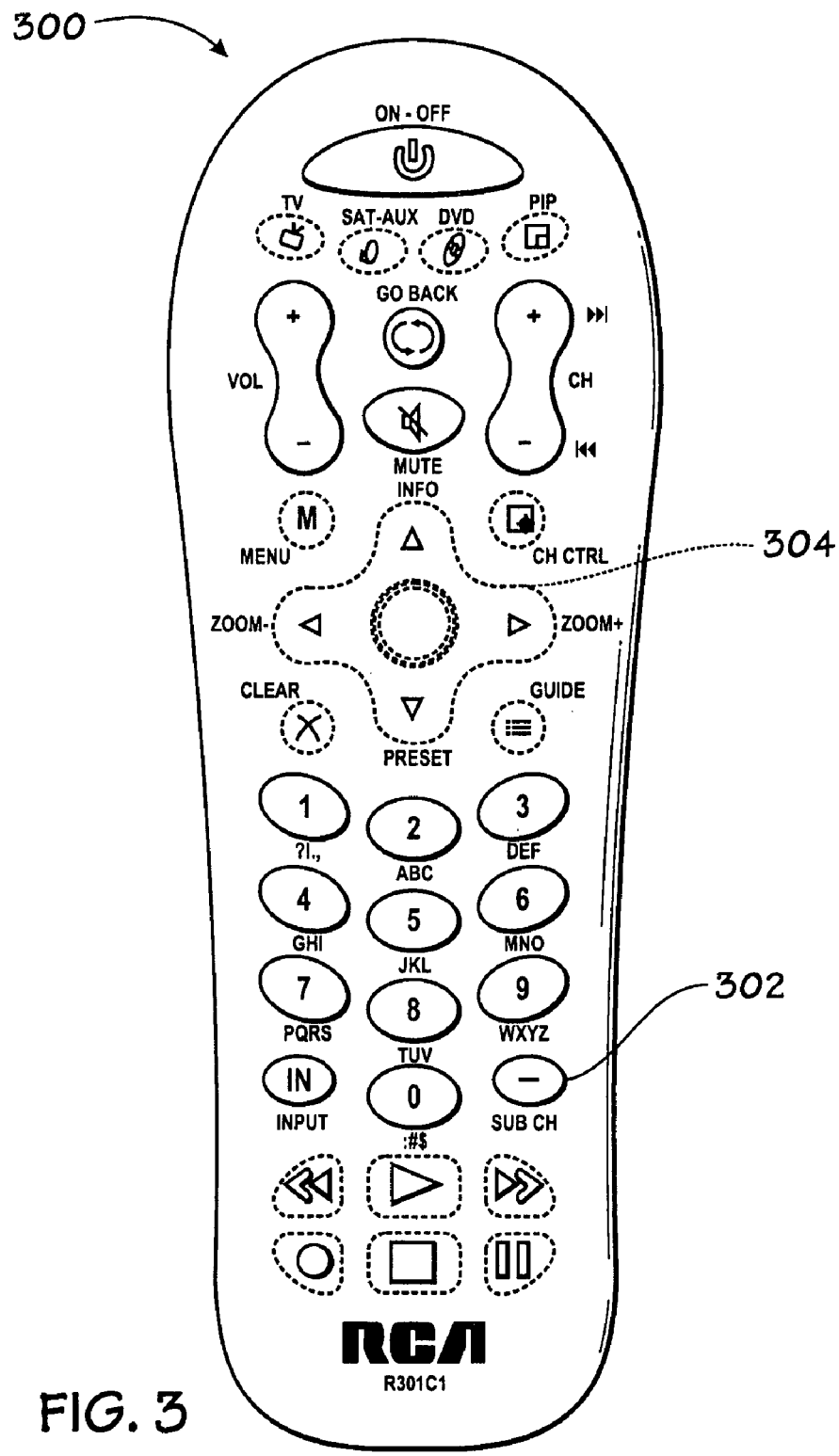
FIG. 3 is a top view of a remote control device in accordance with an alternative exemplary embodiment of the present invention.

FIG. 3 is a top view of a remote control device in accordance with an alternative exemplary embodiment of the present invention. The exemplary remote control shown in FIG. 3 is generally referred to by the reference number 300. The remote control 300 comprises a SUBCHANNEL button 302 (labeled SUB CH in FIG. 3) and an OK button 304.

Figure 4:
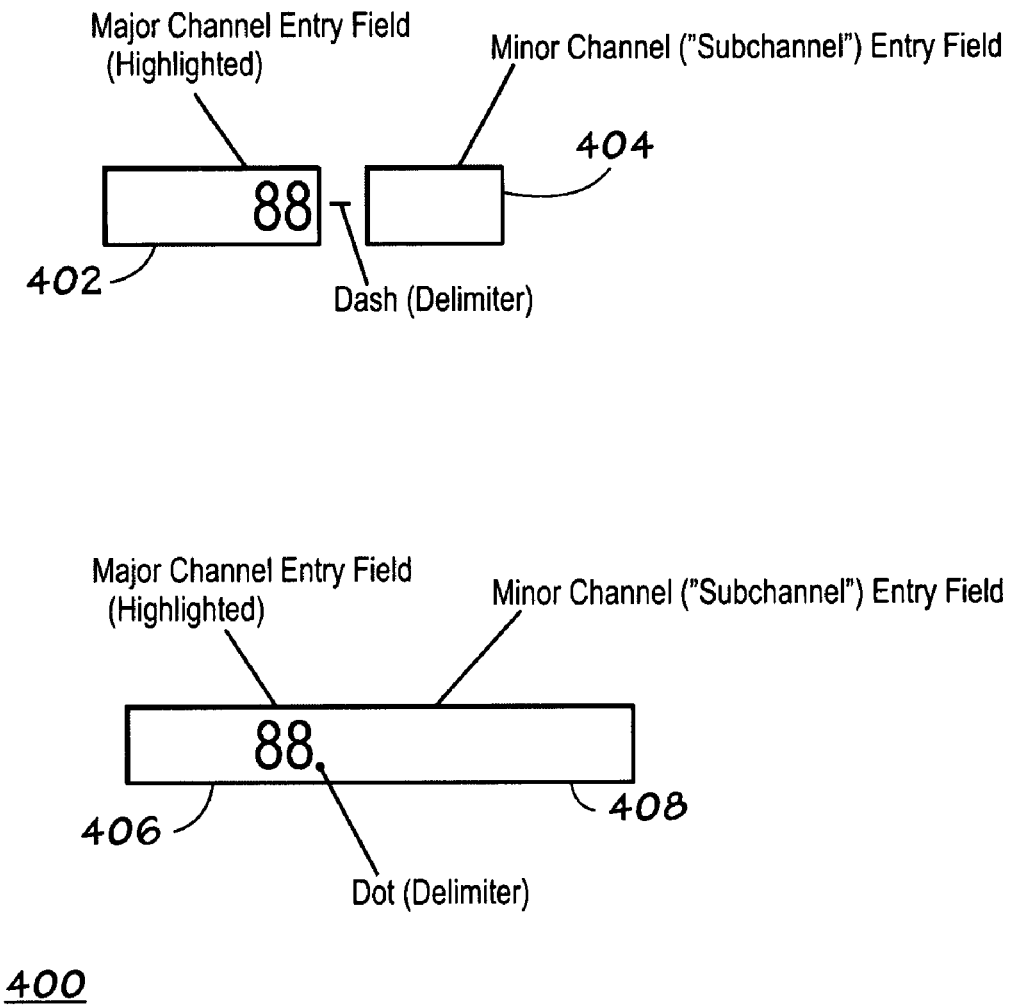
FIG. 4 is a diagram illustrating two alternative exemplary embodiments of a major channel entry field and a minor channel entry field in accordance with an exemplary embodiment of the present invention.

FIG. 4 is a diagram illustrating two alternative exemplary embodiments of a major channel entry field and a minor channel entry field in accordance with an exemplary embodiment of the present invention. The diagram illustrated in FIG. 4 is generally referred to by the reference numeral 400. The first exemplary embodiment comprises a major channel entry field 402 and a subchannel (or minor channel) entry field 404. The major channel entry field 402 and the subchannel entry field 404 are separated by a dash delimiter.

The second exemplary embodiment shown in the diagram 400 comprises a major channel entry field 406 and a subchannel entry field 408. The major channel entry field 406 and the subchannel entry field 408 are separated by a dot delimiter.

Figure 5:
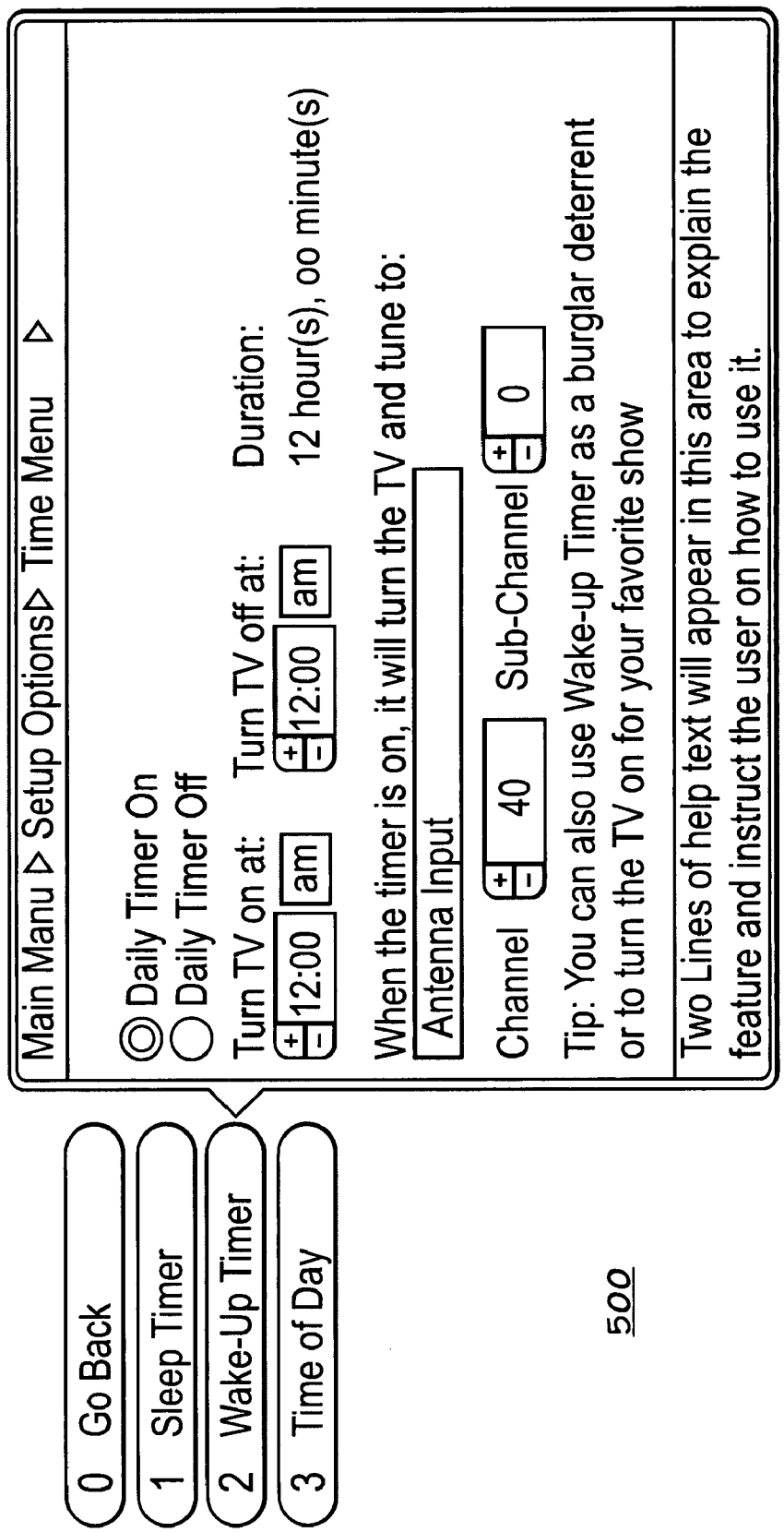
FIG. 5 is a diagram illustrating a menu display in accordance with an exemplary embodiment of the present invention.

FIG. 5 is a diagram illustrating a menu display in accordance with an exemplary embodiment of the present invention. The menu display is generally referred to by the reference number 500.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A channel entry device, comprising:
    a SUBCHANNEL button; and
    control circuitry comprising a processor and memory, wherein the control circuitry is adapted to detect when the SUBCHANNEL button is pressed and to thereafter:
        receive a subchannel selection when a subchannel entry field is highlighted on an on-screen display of an associated electronic device concurrent with the SUBCHANNEL button press and then transmit the subchannel selection to the electronic device;
        display channel and subchannel information on the on-screen display of the electronic device and highlight the subchannel entry field when a digital channel is displayed by the electronic device concurrent with the SUBCHANNEL button press;
        switch from an analog channel to an associated digital channel when an analog channel is displayed by the electronic device concurrent with the SUBCHANNEL button press; and
        navigate a channel menu when the channel menu is displayed by the electronic device concurrent with the SUBCHANNEL button press.

2. The channel entry device recited in claim 1, wherein the associated electronic device comprises a television.

3. The channel entry device recited in claim 1, wherein the associated electronic device comprises a television set top box.

4. The channel entry device recited in claim 1, wherein the channel entry device comprises a remote control device.

5. The channel entry device recited in claim 1, wherein the subchannel selection corresponds to a digital television subchannel.

6. The channel entry device recited in claim 1, comprising an OK button, wherein the channel entry device is adapted to transmit the subchannel selection to an associated electronic device when the OK button is pressed.

7. The channel entry device recited in claim 6, wherein the OK button comprises a general data submission button whose purpose is to signify to the associated electronic device that a user wishes to transmit a data input for action by the associated electronic device.

8. An electronic device, comprising:
    a tuner that is adapted to tune a selected analog channel; and
    a processor that is adapted to:
        control operation of the electronic device;

search a channel database for an available digital channel corresponding to the selected analog channel;

cause the tuner to tune the available digital channel corresponding to the selected analog channel upon receipt of a SUBCHANNEL command issued from a channel entry device based on activation of a SUBCHANNEL button of the channel entry device when the selected analog channel is displayed by the electronic device;

display channel and subchannel information on an on-screen display of the electronic device and highlight a subchannel entry field upon receipt of the SUBCHANNEL command issued from the channel entry device based on activation of the SUBCHANNEL button of the channel entry device when a digital channel is displayed by the electronic device;

receive a subchannel selection and cause the tuner to tune the selected subchannel upon receipt of the SUBCHANNEL command issued from the channel entry device based on activation of the SUBCHANNEL button of the channel entry device when the subchannel entry field is highlighted on the on-screen display of the electronic device; and navigate a channel menu upon receipt of the SUBCHANNEL command issued from the channel entry device based on activation of the SUBCHANNEL button of the channel entry device when the channel menu is displayed by the electronic device.

9. The electronic device recited in claim 8, wherein the electronic device comprises a video display device.

10. The electronic device recited in claim 8, wherein the electronic device comprises a television.

11. The electronic device recited in claim 8, wherein the electronic device comprises a television set top box.

12. The electronic device recited in claim 8, wherein the channel entry device comprises a remote control device.

13. The electronic device recited in claim 8, wherein the available digital channel is a digital television channel comprising a major channel number and a subchannel number.

14. An electronic device, comprising:
a tuner that is adapted to tune a selected digital channel; and
a processor that is adapted to:

cause the electronic device to display a major channel information field populated with an entry corresponding to a major channel number of the selected digital channel and to highlight an unpopulated subchannel information field on an on-screen display of the electronic device for entry of a subchannel number by a user upon receipt of a SUBCHANNEL command issued from a channel entry device based on activation of a SUBCHANNEL button of the channel entry device when the selected digital channel is displayed by the electronic device;

cause the tuner to tune the channel having the major channel number and the subchannel number upon receipt of the SUBCHANNEL command issued from the channel entry device based on activation of the SUBCHANNEL button of the channel entry device when the subchannel information field is highlighted on the on-screen display of the electronic device;

switch from an analog channel to an associated digital channel upon receipt of the SUBCHANNEL command issued from the channel entry device based on activation of the SUBCHANNEL button of the channel entry device when an analog channel is displayed by the electronic device; and navigate a channel menu upon receipt of the SUBCHANNEL command issued from the channel entry device based on activation of the SUBCHANNEL button of the channel entry device when the channel menu is displayed by the electronic device.

15. The electronic device recited in claim 14, wherein the electronic device comprises a video display device.

16. The electronic device recited in claim 14, wherein the electronic device comprises a television.

17. The electronic device recited in claim 14, wherein the electronic device comprises a television set top box.

18. The electronic device recited in claim 14, wherein the channel entry device comprises a remote control device.

19. The electronic device recited in claim 14, wherein a channel corresponding to the major channel number and an entered subchannel value is a digital television channel.

* * * * *